(No Model.)

R. E. LINHAM, Dec'd.
H. LINHAM, Executrix.
MOLDING CUTTER.

No. 472,676. Patented Apr. 12, 1892.

Witnesses:

Robert E. Linham
Inventor:
By Thomas E. Barrow
Attorney.

UNITED STATES PATENT OFFICE.

ROBERT E. LINHAM, OF MANSFIELD, OHIO; HERMIE LINHAM, EXECUTRIX OF SAID ROBERT E. LINHAM, DECEASED, ASSIGNOR, BY MESNE ASSIGNMENTS, TO THE LINHAM DADO MACHINE COMPANY, OF SAME PLACE.

MOLDING-CUTTER.

SPECIFICATION forming part of Letters Patent No. 472,676, dated April 12, 1892.

Application filed February 14, 1890. Serial No. 340,468. (No model.)

*To all whom it may concern:*

Be it known that I, ROBERT E. LINHAM, a citizen of the United States, residing at Mansfield, in the county of Richland and State of Ohio, have invented certain new and useful Improvements in Molding-Cutters; and I do declare the following to be a full, clear, and exact description of the invention, such as will enable others skilled in the art to which it appertains to make and use the same.

My invention relates to molding-cutters; and it has for its object to provide a cutter for making a groove or bead at one continuous operation.

With this end in view my improved cutter comprises a cylindrical shank and an integral foot which projects outward from the shank substantially at right angles, said cutter-foot having a compound curvature or angularly-arranged parts or members disposed so as to form a bead or channel in the work of molding and a throat or recess.

The cutter is designed for use in a cutter-head that is described and claimed in a separate application filed of even date herewith, Serial No. 340,466, and the cutter may be used singly or in combination with one, two, or more cutters, which are relatively arranged to produce the desired style of molding.

Figure 1:
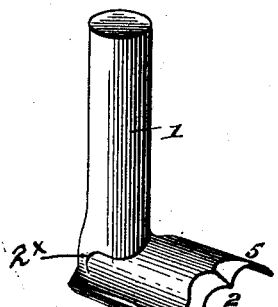
Figure 2:
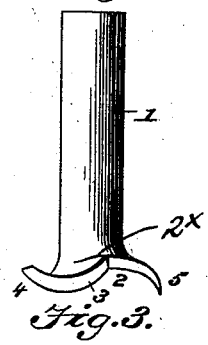
Figure 3:
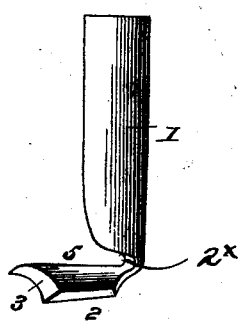

In the accompanying drawings, Figure 1 represents a perspective view of my cutter. Fig. 2 is a front elevation, and Fig. 3 is a side elevation.

In the drawings, 1 designates the cylindrical shank, and 2 the cutter-foot, of my improved cutter for making moldings. The shank and the cutter foot or biade are made of a single piece of steel, and the one is arranged substantially at right angles to the other—that is, the foot or blade projects outwardly from the shank, and at the point of jointure between the shank and the foot or blade is formed a throat or recess $2^\times$, which permits the cut material to freely pass away from the blade or foot, and thereby obviates choking the same. The blade or foot is formed with alternate elevations or depressions or made corrugated in cross-section, or the two members or parts form a compound curve, in order that the cutter may form a bead or channel in the molding at one operation.

In the drawings I have shown the blade or foot corrugated on a line transversely across the shank; but it is evident that the particular configuration can be varied both in form and proportions without departing from the spirit of my invention.

The blade or foot is beveled at its front edge to form a cutting-edge 3 in front of the main part of the said blade or foot, in order to form an advanced cutting-edge, and the lower surface of the blade is unbroken to form a clear working surface, which is presented to the work.

In use the shank of the cutter is clamped in a rotary cutter-head, so that the working surface and beveled edge of the blade face the work as the cutter is carried around with the head, and said cutter operates with a shear cut and produces a molding which conforms in size and configuration to the particular cutter employed.

The cutter may be used singly or in pairs with one, two, or more of a series of cutters for producing moldings of the desired configuration.

Having thus described my invention, what I claim is—

The herein-described foot or cutter for the purpose named, consisting of a shank having a foot arranged at a right angle thereto and formed with an alternate elevation or depression and having the forward cutting-edge, thus making a compound - curved cutting-edge, and a throat between the rear of the foot and lower portion of the shank to allow the cut material to readily pass away from said foot, substantially as described.

In testimony whereof I affix my signature in the presence of two witnesses.

ROBERT E. LINHAM.

Witnesses:
ABRAHAM SMALL,
J. C. LASER.